UNITED STATES PATENT OFFICE.

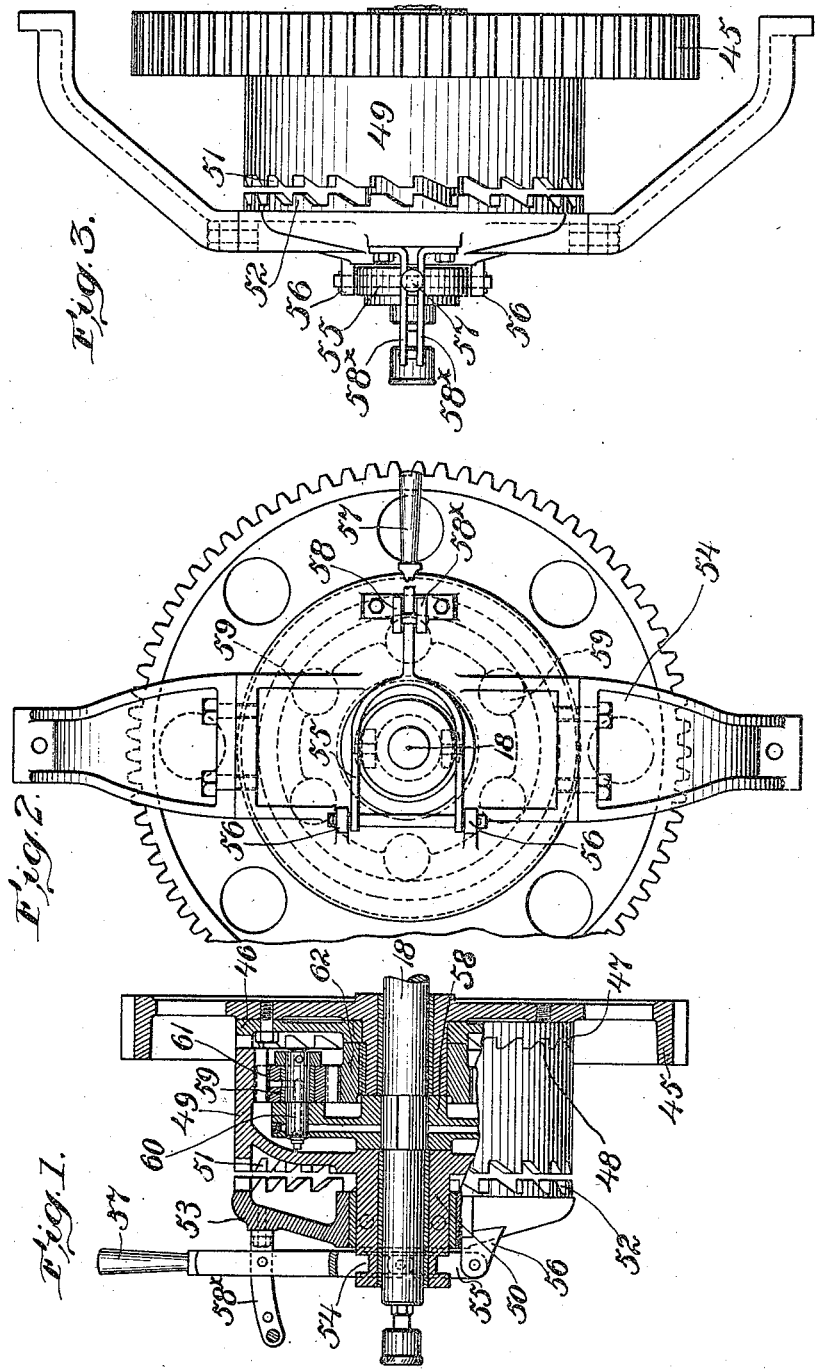

ALMON E. NORRIS, OF CAMBRIDGE, MASSACHUSETTS.

TRANSMISSION MECHANISM.

1,193,916.

Specification of Letters Patent. Patented Aug. 8, 1916.

Application filed February 19, 1907. Serial No. 358,171.

*To all whom it may concern:*

Be it known that I, ALMON E. NORRIS, a citizen of the United States, residing at Cambridge, in the county of Middlesex and State of Massachusetts, have invented an Improvement in Transmission Mechanism, of which the following description, in connection with the accompanying drawings, is a specification, like letters on the drawings representing like parts My invention relates to power transmission mechanism, and will be best understood by reference to the following description when taken in connection with the accompanying illustration of one specific embodiment thereof, while its scope will be more particularly pointed out in the appended claims.

In the drawings:—Figure 1 is a plan partly in section of a transmission mechanism embodying my invention; Fig. 2 is an end elevation of the transmission mechanism; and Fig. 3 is a side elevation thereof.

Referring to the drawings, and to the embodiment of my invention there shown, a driving gear 45 is loosely mounted (Fig. 1) upon an extension of a counter-shaft 18, but has bolted to its side the plate 46, the latter provided with an annular flange presenting a series of teeth 47, adapted to register and coöperate with a similar but reversely arranged series of teeth 48, formed in the rim of a drum 49, which latter, through the medium of the hub 50, is also revolubly mounted upon the countershaft 18. The opposite or outer edge of the drum 49 is provided with a second series of teeth 51, the latter adapted in turn to mesh with a like series of teeth 52, formed upon the edge of an inturned annular rim 53, carried by the fixedly positioned bridge frame-piece 54. The drum 49, while revoluble upon the countershaft, may be slid lengthwise the same to cause interlocking engagement between the teeth at either end of the drum upon the adjacent teeth of the gear plate 46 on the one hand, or the fixed annular flange 53 on the other. For this purpose the hub 50 is grooved at 54 and this groove is engaged by a pair of diametrically opposite pins, secured to the yoke 55, the latter pivoted to a pair of ears 56 upon the stationary bridge frame. A handle 57 for the yoke is provided working between a pair of fixed segmental guides 58×, and by movement of this handle the drum may be slid in either extreme position. In Fig. 1 it is represented as thrown to its innermost position where it is locked fast to the driving gear 45.

Between the hub 50 of the drum 49 and the gear 45 there is keyed fast to the countershaft 18 a driving member 58 which carries one or more, herein six, planetary gears 59 mounted each for free rotation upon a stud 60 secured to the face of the member 58. The gears 59 are caused to mesh with internal teeth 61 upon the interior of the drum 49 and also with the teeth of a pinion 62, the latter keyed to the hub of the large gear 45. The teeth of the internal gear 61 are of sufficient width to permit a proper engagement between the same and the planetary gears in either of the extreme longitudinal positions of the drum. The effect of this construction is to provide two speeds for the countershaft 18, one a direct drive from the gear 45 and the other relatively slow through the planetary gearing described. When the handle 57 is thrown to the position shown in Fig. 1 and the drum 49 is locked to the driving gear 45, the planetary gear 59 being locked between the internal gear 61 and the pinion 62, the entire mechanism including the driving member 58, and the driving gear 45, revolves as a unit. When the handle 57 is thrown toward the left from the position shown in Fig. 1, the drum 49 being held fixed by engagement with the fixed frame member and disengagement from the driving gear 45, the pinion 62 turns the planetary gears, causing them to travel about the face of the internal gear 61 and producing a relatively slow rotative movement of the driving member 58 and the countershaft 18, though in the same direction as before.

It will be observed that the relation between the two sets of teeth is such that the teeth at one end of the drum engage with the adjacent coöperative teeth of the gear before the teeth at the opposite end of the drum are disengaged from the fixed set of teeth 52, so that driving movement is transmitted from the motor to the hoisting drums without interruption, even though the device be shifted from one speed to another. In shifting the drum inwardly from low speed to high the initial engagement with the teeth on the gear with the teeth on the drum tends to draw the drum still farther and complete the shifting movement.

It will be obvious that in place of the fixed toothed frame member 53 for holding the drum stationary at the slow speed, there might be employed any other suitable means as, for example, a band brake or the like.

While I have shown and described one form of my invention it will be understood that the same is not limited in the details of construction or in the form or arrangement of parts, but that extensive deviations may be made from the construction shown and described without departing from the spirit of the invention.

Claims:

1. A transmission mechanism comprising a driving member carrying a gear, a driven member, having a shaft mounted to turn within said driving member, a rotatable member carrying a gear, means for holding said rotatable member fixed or for clutching the same to said driving member and a planet gear journaled on said driven member and meshing with the first and second mentioned gears.

2. A transmission mechanism comprising a shaft, a driving member rotatably mounted thereon, a driven member secured to said shaft, intermediate planetary gearing between said driving and driven members, and means for locking said driving member to said planetary gearing or for causing said driving member to drive said driven member through said intermediate planetary gearing.

3. In a transmission mechanism, the combination with planetary gearing including a driving member carrying an externally toothed gear, an axially fixed driven member, and a planet gear carried by said driven member, of a non-rotatable member, a sliding member mounted for sliding movement to lock said driving member, said planet gear, and said sliding member together to rotate as a unit, or to cause transmission of driving movement through rotation of said planet gear about its axis upon opposite sliding movement of said sliding member into engagement with said non-rotatable member, and means for moving said sliding member axially independently of said driven member.

4. A transmission apparatus comprising a transmission shaft, a driving member loosely mounted on said shaft, a driven member fixedly secured to said shaft, an intermediate planet gear between the driving and the driven member, a sliding toothed locking member adapted to be moved into engagement with said driving member and having a gear simultaneously meshing with said planet gear, thereby locking said driving and said driven members together, means for withdrawing said sliding member from engagement with said driving member to permit the transmission of driving movement through said planet gear, and means for holding said sliding member against rotation.

5. A transmission apparatus comprising an axially immovable driven member carrying a planet gear, a driving member carrying an externally toothed gear, an axially movable rotatable member carrying an internally toothed gear, and means for axially moving and locking said rotatable member to said driving member or for disengaging the same from said driving member and holding it fixed against rotation.

6. A transmission apparatus comprising a driven member carrying a gear, a driving member carrying a gear, a rotatable member carrying a gear, one of said gears being an internal gear, another being a pinion, and another being an intermediate pinion meshing with the other pinion and said internal gear, a bearing member on which said rotatable member is journaled, means directly connected to said rotatable member for sliding said rotatable member in a direction to lock said driving and driven members together, and a fixed frame member having teeth, said rotatable member having teeth meshing therewith whereby when said rotatable member is moved in the opposite direction it is held fixed against rotation by said frame member.

7. A transmission apparatus comprising a driving member carrying a gear, a driven member carrying a gear, a stationary member, an intermediate rotatable drum carrying a gear, one of said gears being an internal gear, another being a pinion, and another being an intermediate pinion meshing with the other pinion and said internal gear, a bearing member for said intermediate rotatable drum, said driving member, said stationary member and said rotatable drum having teeth, said drum being slidably mounted between said driving member and said stationary member, and means directly connected to said drum for moving said drum to have toothed engagement with either said stationary or said driving member.

8. A transmission apparatus comprising a transmission shaft, a driving member loosely mounted thereon, a driven member keyed to said shaft, an intermediate planet gear between said driving member and said driven member, and a controlling member slidable lengthwise said shaft for locking said driving member to said driven member or for permitting transmission of driving movement through said planet gear.

9. A transmission apparatus comprising a driving member, an axially fixed driven member, a longitudinally slidable rotatable controlling member, said driving, driven and controlling members carrying speed reduction gearing elements, and means directly connected to said controlling member for sliding said controlling member to lock together said driving member and said gearing elements, or to hold said controlling member fast against rotation to permit transmission of driving movement through said speed reduction gearing.

10. A transmission apparatus comprising a transmission shaft and carrying a driving member loosely mounted on said shaft, a pinion, a driven member secured to said shaft, a rotatable controlling member carrying an internal gear, an intermediate pinion meshing both with said driving pinion and said internal gear and carried by said driven member, and means for clutching said controlling member to said driving member or for holding the same fast against rotation.

11. A transmission mechanism comprising, in combination, a driving member, a driven member, a rotatable member, interlocking connections for holding said rotatable member fixed or for connecting the same to said driving member, and intermeshing planetary gearing between the driving and the driven member, said gearing including a gear carried by said rotatable member.

12. In a hoisting apparatus, the combination with the shaft 18, the gear 45 loosely mounted thereon, toothed member 46 carried by the gear 45, the non-rotatable toothed member 53, the toothed member 49 engageable alternately with the toothed members 46 and 53, and the intermediate planetary gearing between the shaft and the member 49.

13. In a hoisting apparatus, the combination with a driving member and a driven member, of the toothed rotatable member 49, the fixed interlocking member 53 to which the rotatable member may be locked, means for interlocking the rotatable member with the driving member to drive the same thereby, and the intermediate planetary gearing between the driven member and the member 49.

In testimony whereof, I have signed my name to this specification, in the presence of two subscribing witnesses.

ALMON E. NORRIS.

Witnesses:
 THOMAS B. BOOTH,
 LIZZIE M. WATTS.

Copies of this patent may be obtained for five cents each, by addressing the "Commissioner of Patents, Washington, D. C."

It is hereby certified that in Letters Patent No. 1,193,916, granted August 8, 1916, upon the application of Almon E. Norris, of Cambridge, Massachusetts, for an improvement in "Transmission Mechanism," errors appear in the printed specification requiring correction as follows: Page 3, line 8, claim 10, strike out the words "and carrying" and insert a comma; same page and claim, line 9, after the word "shaft" strike out the comma and insert the words *and carrying;* and that the said Letters Patent should be read with these corrections therein that the same may conform to the record of the case in the Patent Office.

Signed and sealed this 21st day of November, A. D., 1916.

[SEAL.]

F. W. H. CLAY,
*Acting Commissioner of Patents.*

Cl. 74—34.